United States Patent [19]

Helle

[11] 4,439,671
[45] Mar. 27, 1984

[54] MAGNETORESISTANT TRANSDUCTION DEVICE FOR READING LOW DENSITY CODED DATA

[75] Inventor: Michel Helle, Marcq, France

[73] Assignee: Compagnie Internationale Pour L'Informatique Cii-Honeywell Bull (Societe Anonyme), Paris, France

[21] Appl. No.: 356,432

[22] Filed: Mar. 9, 1982

[30] Foreign Application Priority Data

Jun. 19, 1981 [FR] France ............................ 81 12071

[51] Int. Cl.$^3$ .............................................. G06K 7/08
[52] U.S. Cl. .................................. 235/449; 360/113; 235/450
[58] Field of Search .................. 235/429, 450; 365/62, 365/133; 360/113, 114

[56] References Cited

U.S. PATENT DOCUMENTS

| 3,887,944 | 6/1975 | Bajorek | 360/113 |
| 4,197,987 | 4/1980 | Lazzari | 235/449 |
| 4,356,523 | 10/1982 | Yeh | 360/113 |

OTHER PUBLICATIONS

IBM—Tech. Disclosure Bulletin, vol. 16, No. 5, 10/73, p. 1372.

Primary Examiner—A. D. Pellinen
Assistant Examiner—Robert Lev
Attorney, Agent, or Firm—Kerkam, Stowell, Kondracki & Clarke

[57] ABSTRACT

A magnetoresistant transduction device for reading coded data comprises a plurality of magnetoresistances ($MRI_1$ to $MRI_5$), which are placed in alignment and spaced from a magnetization device (DAI) by means of a grid (GMI) of non-remanent magnetic material, having parallel elements ($EFI_1$ to $EFI_5$) situated between the magnetization device and the magnetoresistances and to which the magnetoresistances are secured either directly or by means of a substrate. The parallel elements serve to focus the magnetic field generated by the magnetization device, which may be in the form of a permanent magnet, such that a plurality of n mutually independent magnetic fields is formed, each field being associated with a corresponding magnetoresistance. The transduction device is applicable to the reading of coded data of very low density, utilized more particularly in franking machines.

8 Claims, 12 Drawing Figures

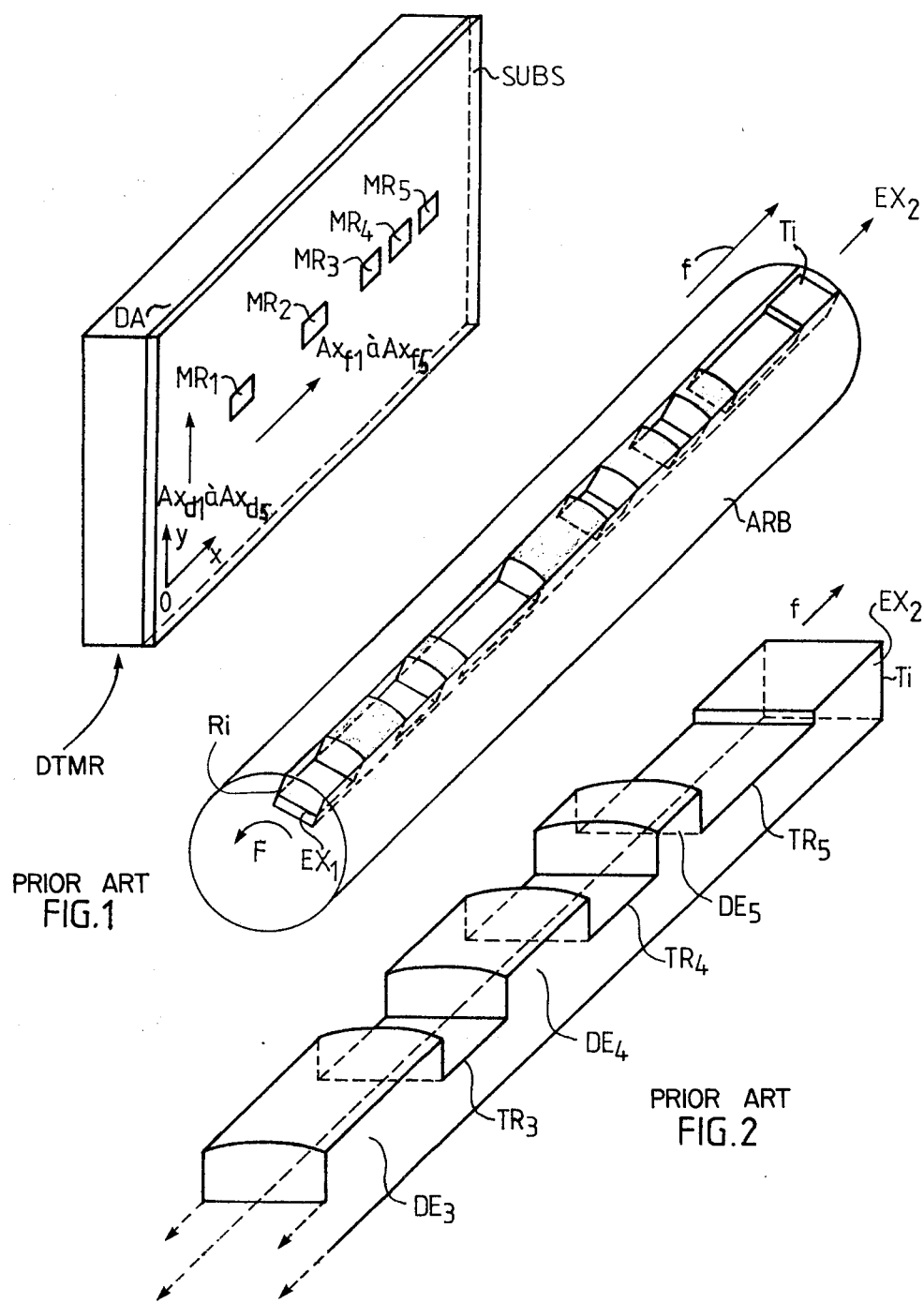
PRIOR ART
FIG.1
PRIOR ART
FIG.2

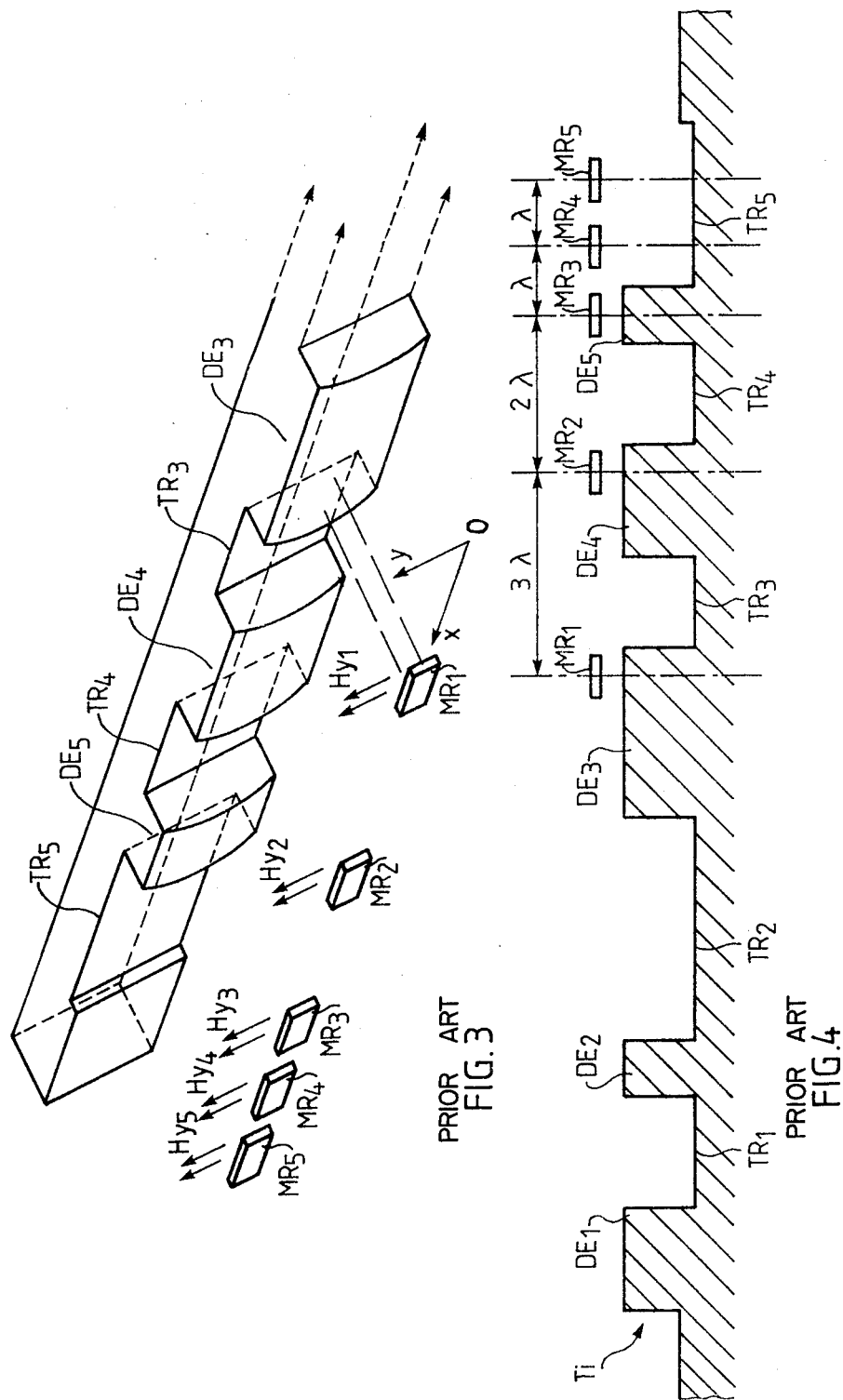

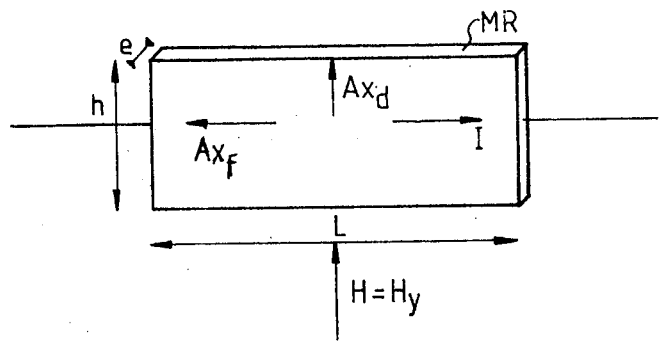
PRIOR ART
FIG. 5
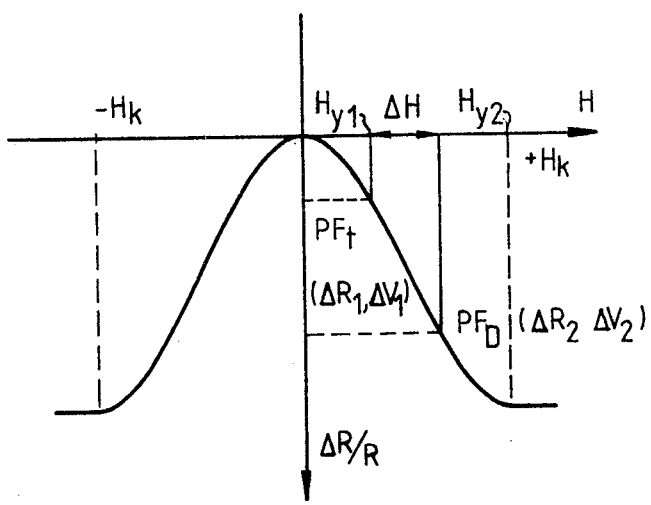
PRIOR ART
FIG. 6

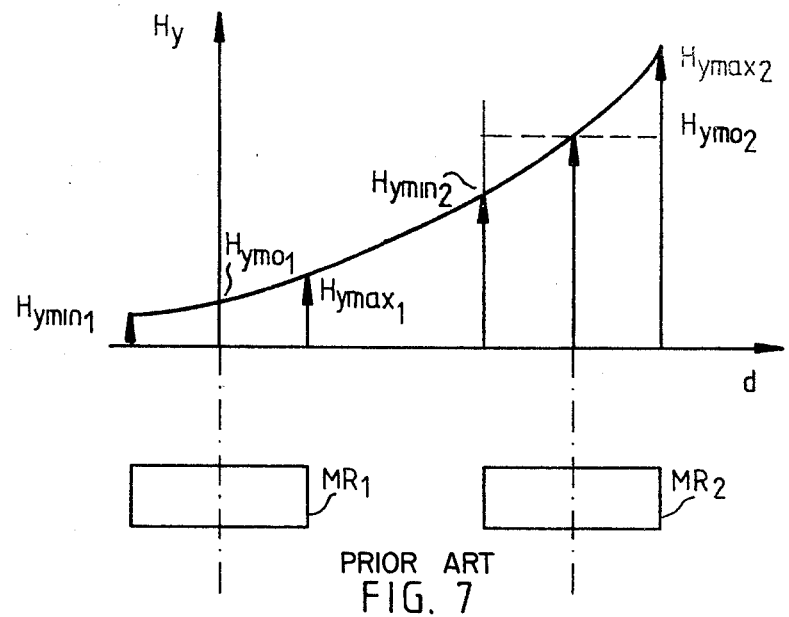
PRIOR ART
FIG. 7
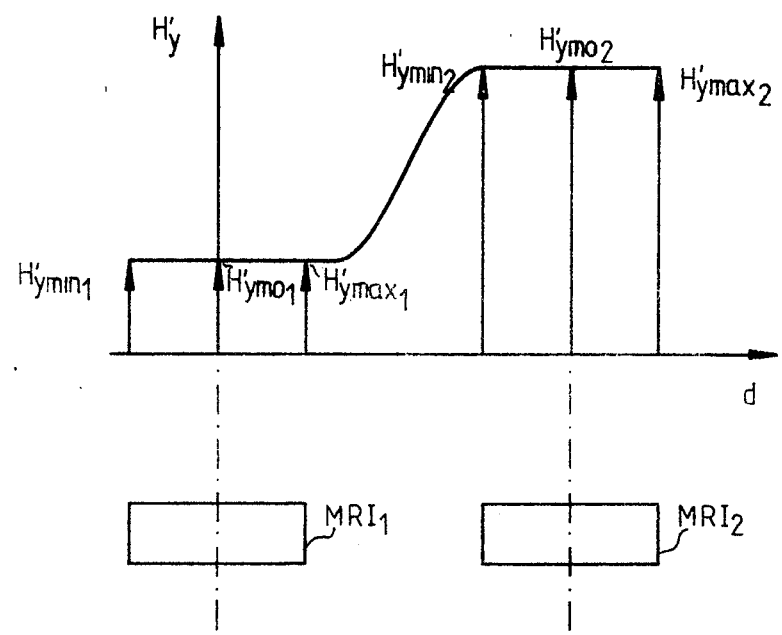
FIG. 12

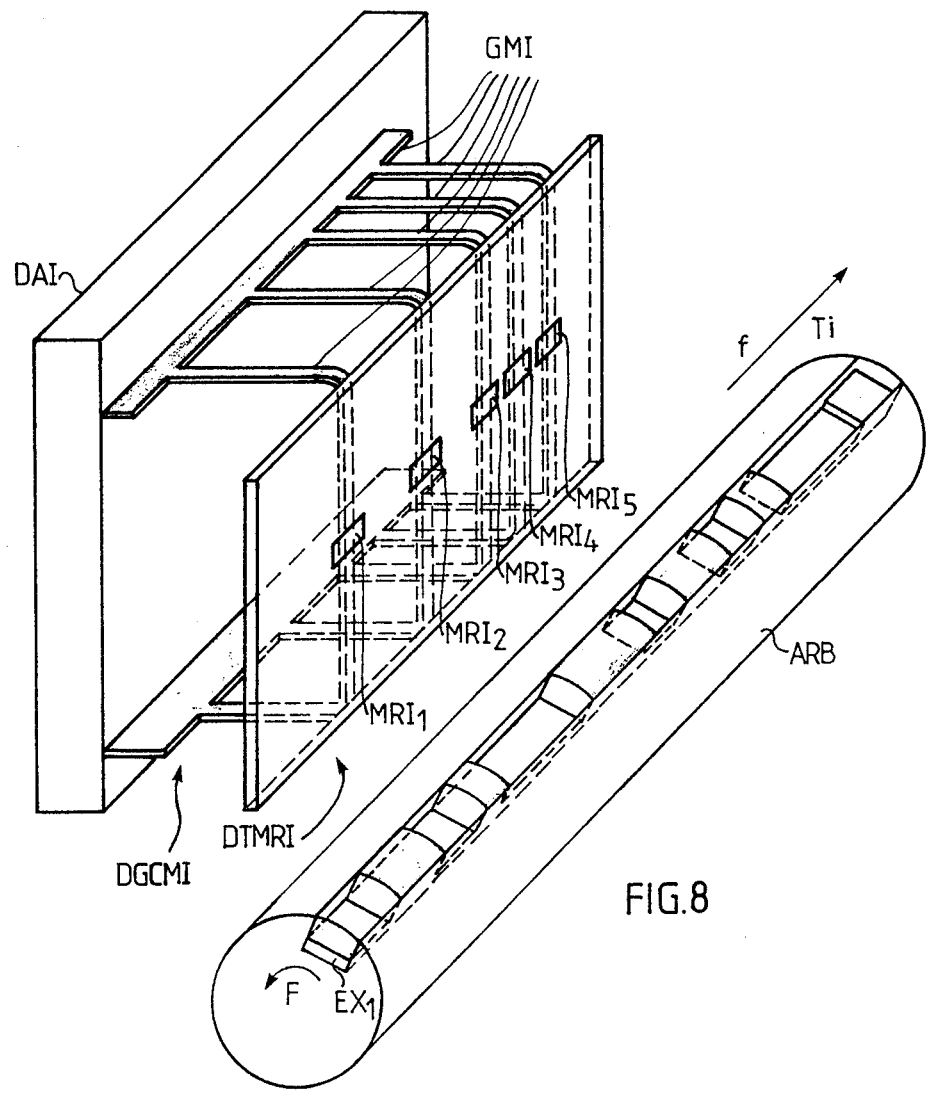
FIG.8
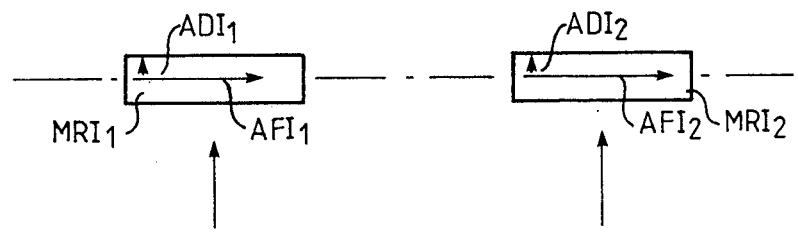
FIG.11

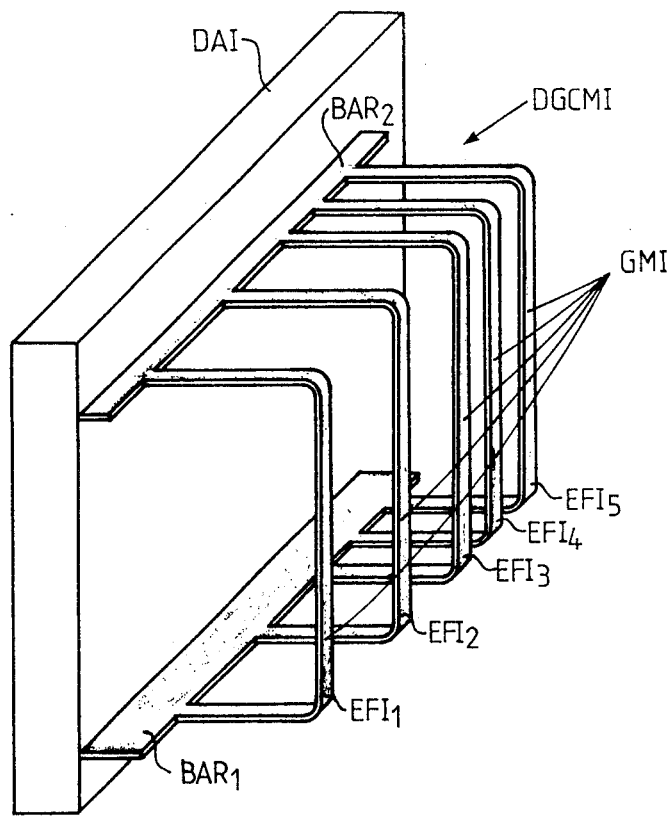
FIG.9
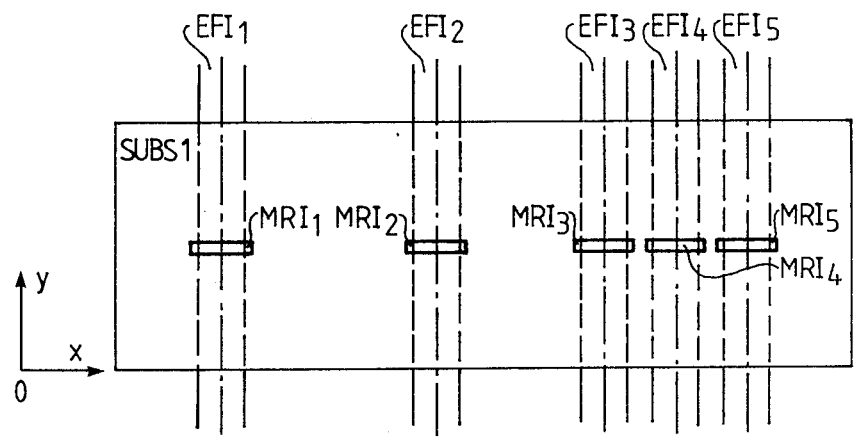
FIG.10

MAGNETORESISTANT TRANSDUCTION DEVICE FOR READING LOW DENSITY CODED DATA

BACKGROUND OF THE INVENTION

1. Field of the Invention

The present invention relates to a magnetoresistant transduction device for reading low density coded data. It is of particular use in franking or mailing machines in order to detect and check as to whether the data printed by these machines on the envelopes to be stamped, corresponds to the printing instructions.

2. Description of the Prior Art

In large undertakings, large offices and more commonly in all premises at which an economic and/or social human activity is carried on, and in which the mail dealt with and dispatched is numerically very substantial, it is impractical to frank the latter in conventional manner, that is to say manually by means of stamps. Instead of these, the value of the postage is imprinted directly on the envelope. Thus, for a postage value of twenty cents, for example, the FIG. 20 is imprinted on the envelope to be dispatched, instead of affixing a twenty cent stamp on this letter.

The operation which consists in imprinting the mail franking values is performed by means of "franking machines", which are now well known and in widespread use. For example, such machines are produced and commercially available from the French company, SECAP, located at 21, Quai Legallot, Boulogne Billancourt, France.

In these machines, the printed postage values may comprise up to four digits, two of these being situated in front of the decimal point and two behind the latter.

The principle of franking machine is comparatively simple. These machines comprise a revolving shaft in which are formed a plurality of grooves of which the axis of symmetry is parallel to the shaft generatrix, i.e., axis. These grooves have installed in them rods having a length greater than that of the shaft. There are as many rods as there are digits in the postage value, generally four.

At one of its extremities, each rod is integral with a first wheel bearing which has a number of projections at its periphery each being able to come into contact with this extremity. This wheel is itself integral with a second wheel which, at its periphery, bears ten printing symbols which corresponding to the numerals from 0 to 9, each symbol being allocated to a given circumferential position of the first wheel.

Each of the four rods may slide within the groove in which it is situated. To this end, it comprises a rack at its other extremity opposite to that which is in contact with the wheel bearing the projections. Each of the racks is associated with and controlled by a code barrel wheel. In order to print one of the four numerals of a postage figure, the corresponding coding wheel is caused to turn until the displacement of the associated rod causes rotation of the wheel bearing the printing symbols through an angle such that the symbol corresponding to the numeral it is intended to print comes into contact with the letter which is to be franked and thereby prints the required numeral.

It is, however, of importance to check on whether the number actually printed corresponds to the number for which a printing order has been issued by means of the coding wheel.

To allow this check to be carried out, each rod is provided with a set of notches delineating a group of gaps and teeth. The four rods are preferably identical, that is to say, comprise the same combination of gaps and teeth. The set of four rods is associated with a transduction device which is stationary.

The rod occupies a different position within the groove, each time a given numeral is printed. Since the transduction device is stationary, it is apparent that when one of the four rods is placed in front of the transduction device, the transduction device is confronted by the position occupied by the rod.

In other words, depending on the position occupied by the rod within the groove, the transduction device is confronted with ten different possible combinations of gaps and teeth. The transduction device preferably supplies a set of five signals for each combination of gaps and teeth. Ten different sets of five signals which consequently constitute a mode, clearly correspond to the ten different combinations of gaps and teeth.

A signal of a first kind (for example, a positive pulse) corresponds to a gap. A signal of a second kind (for example, a zero value pulse) corresponds to a tooth. Consequently, it is apparent that the transduction device supplies a set of five binary signals. As a rule, this set of five binary signals is decoded by an appropriate electronic circuit enabling the franking machine operator to check whether the figure printed by the machine is actually the figure which had been instructed to be printed.

In current practice, the transduction device utilized in franking machines are transduction devices comprising magnetoresistances.

It will be recalled that a magnetoresistance is an element formed of a magnetic material of which the electrical resistance R varies as a function of the magnetic field to which it is exposed, these magnetoresistances being situated on a substrate of electrically insulating material.

Let us consider a measuring magnetoresistance R connected to the terminals of a current generator which delivers a current having the intensity I flowing in the direction of the length of the magnetoresistance. When this magnetoresistance is exposed to a magnetic field H, the latter causes a change $\Delta R$ of its resistance, leading to a variation $\Delta V = I \times \Delta R$ at its terminals, which gives $\Delta V/V = \Delta R/R$ in which $\Delta R/R$ is referred to as the "magnetoresistance factor". It is thus apparent that the voltage variation picked up at the terminals of the magnetoresistance is greater the higher the resistance R.

The electrical signal derived across the terminals of a magnetoresistance is a function only of the value of the field H to which it is exposed.

It will be recalled that the ratio between B and H, that is between magnetic induction and the magnetic field itself when B and H are close to zero, and this on the first magnetization curve, is referred to as "initial magnetic permeability of a magnetic material". (It will be recalled that the first magnetization curve is the curve plotting the variation of B as a function of H when the magnetoresistance is exposed to a magnetic magnetizing field, and starts from an initial magnetic state of the material defined by B and H being close to zero). In other words, the initial magnetic permeability of the magnetic material is equal to the slope of the first magnetization curve close to the point $B=0$ and $H=0$. On the other hand, it will be recalled that a magnetically anisotropic material arranged in a plane, meaning that its thickness is much smaller than its length and equally than its width, has two preferential generally mutually perpendicular directions of magnetization within itself. One of these is referred to as the "direction of easy magnetization", whereas the other is referred to as the "direction of difficult magnetization". The initial permeability of the material in the direction of difficult magnetization is much greater than the initial permeability of the material in the direction of easy magnetization.

In current practice, the transduction devices comprising magnetoresistances which are utilized in franking machines, comprises five magnetoresistances of which the length is much greater than the width and which are all aligned, meaning that they have the same direction and are all arranged on one and the same straight line. These are so-called "thick-layer" magnetoresistances, that is to say, which have dimensions of the following order of magnitude: the length L is of the order of 10 millimeters, whereas the width l and the thickness e are of the order of 2 millimeters. The five aligned magnetoresistances are situated on a substrate of plastic material within small openings formed in this substrate. The substrate itself is arranged on a magnetization device, for example, formed by a permanent magnet, most often having a parallelepipedal form.

A transduction device of this nature operates in the following manner: (only one magnetoresistance will be considered since each of these operates in the same manner). When the magnetoresitance is positioned before a tooth of the rod situated in front of it, the magnetic field to which it is exposed is equal to $H_1$. Let as assume that the latter is positive. The resistance of the magnetoresistance is then $R_1$. When this same magnetoresistance is positioned in alignment with a gap, it is exposed to a field $H_2$ which is still positive but smaller than $H_1$. It is apparent that upon passing from a gap to a tooth, there is a negative magnetic field variation ($H = (H_2 - H_1)$) causing a positive resistance variation of the magnetoresistance, namely $\Delta R$, the resistance of the magnetoresistance then being $R_2 = R_1 + \Delta R$. A voltage change $\Delta V = \Delta R \times I$ consequently occurs across the terminals of the magnetoresistance. It is apparent that upon passing from the tooth to the gap, the magnetic field change $H_1 - H_2$ is caused essentially by the deformation of the magnetic field lines generated by the magnetization device. The permeability of the magnetic medium forming the tooth obviously differs from the permeability of the air filling the gap. In other words, upon passing from a tooth to a gap, the magnetoresistance supplies a positive voltage pulse $\Delta V$. It is clear that, conversely, upon passing from a gap to a tooth, the magnetoresistance supplies a negative voltage pulse. The pulses are easy to detect by means of appropriate conventional electronic circuits, whether the magnetoresistance is positioned in alignment with a gap or with a tooth.

Magnetoresistant transduction devices of this nature are comparatively costly since they require several successive production processes corresponding to the mounting of each of the magnetoresistances. Furthermore, a very precise mechanical fitting operation is required to position each of the magnetoresistances within the opening in which it is to be located.

Consequently, it will henceforth be preferable to make use of magnetoresistances formed by thin layers of very small thickness (from a few hundred Ångstrom to a few microns). Nevertheless, it is demonstrable that the signal supplied by each magnetoresistance in response to the magnetic field to which it is exposed, diminishes in appreciable manner as a function of the distance separating the magnetoresistance from the rod of said shaft, in front of which it is situated. It is, therefore, necessary that this distance should be comparatively small. Under these circumstances, the magnetization device of the magnetoresistant transduction device being common to the set of magnetoresistances, and the distance between the magnetoresistances and the rods bearing the set of gaps and teeth being comparatively small, interactions then intervene between the different magnetic fields to which these magnetoresistances are exposed. In other words, the different magnetic fields to which the magnetoresistances are exposed are not independent and there is a diaphony of the signal supplied by each of the magnetoresistances.

SUMMARY OF THE INVENTION

The object of the present invention is to eliminate the problem of diaphony between the different magnetoresistances. This is accomplished by generating a plurality of magnetic fields (being five in the present case) which are highly independent of each other, that is, without interacting with each other. A single source for the magnetic fields is provided, namely the magnetization device formed by a permanent magnet.

This object is achieved by installing between the magnetization device and the magnetoresistances a magnetic grid of non-remanent magnetic material formed by a plurality of parallel elements, equal in number to that of the magnetoresistances, and which focus the magnetic field at the level of the latter.

It will be recalled that a non-remanent magnetic material is a magnetic material which assumes a particular magnetization when it is exposed to an external magnetic field, and which loses this same magnetization when this external magnetic field is no longer applied to it.

The magnetoresistant transduction device for reading coded data in accordance with the invention comprises a plurality of magnetoresistances positioned opposite the data and having the same direction, a magnetization device for generating a magnetic field of which the value at the level of each of the magnetoresistances is a function of the coded data opposite the latter, and a grid of non-remanent magnetic material having parallel elements situated between the magnetization device and the magnetoresistances, one element being allocated to each magnetoresistance, each of the elements focussing the magnetic field generated by the magnetization device at the level of each magnetoresistance, the magnetic fields to which the magnetoresistances are exposed being independent of each other.

The invention also relates to a magnetic field generation device comprising a magnetization device for generating a magnetic field and a grid or lattice of nonremanent magnetic material having a plurality of parallel elements focussing the magnetic field generated by the magnetization device. The grid or lattaice is associated with the magnetization device in such a manner as to generate a plurality of mutually independent magnetic fields in the immediate vicinity of the elements.

BRIEF DESCRIPTION OF THE DRAWINGS

The invention will now be described further by way of example, with reference to the accompanying drawings, in which:

FIG. 1 is a three-quarter perspective view showing a magnetoresistant transduction device DTMR according to the prior art as utilized in franking machines, showing no more than the shaft ARB bearing the different rods corresponding to each of the symbols denoting the franking value which is to be imprinted on the documents which are to be franked;

FIG. 2 is a three-quarter perspective view showing one of the rods $T_1$ of the shaft of the franking machine illustrated in FIG. 1;

FIG. 3 is a three-quarter perspective view showing the relative disposition of the rod $T_i$ and of the five magnetoresistances of the prior art magnetoresistant transduction device, when the rod $T_i$ is positioned in alignment with these five magnetoresistances;

FIG. 4 is a view in cross-section taken through the symmetry plane of the rod $T_i$, showing the five magnetoresistances positioned in alignment with the set of gaps and teeth of the rod $T_i$;

FIG. 5 shows the principle of operation of a magnetoresistance of anisotropic magnetic material;

FIG. 6 is a curve illustrating the variation of a magnetoresistance of anisotropic magnetic material as a function of the magnetic field applied to it in the direction of its axis of difficult magnetization;

FIG. 7 is a curve illustrating the variation of the magnetic field applied in the direction of difficult magnetization of the magnetoresistances of the prior art magnetoresistant transduction device, between two adjacent magnetoresistances, and in the direction of the length of the two magnetoresistances, the variation of this curve leading to a clearer grasp of the disadvantages of the prior art magnetoresistant transduction device;

FIG. 8 is a three-quarter perspective view showing an embodiment of the magnetoresistant transduction device in accordance with the present invention, positioned adjacent the shaft of a franking machine;

FIG. 9 shows a three-quarter perspective view of the magnetic field generation device of the magnetoresistant transduction device in accordance with the present invention;

FIG. 10 is a front view showing the relative disposition of the magnetoresistances of the device according to the invention, and of the different focussing elements of the magnetic grid of the magnetic field generation device shown in FIG. 9;

FIG. 11 shows how the magnetic field is applied to two of the five magnetoresistances of a transduction device in accordance with the invention; and FIG. 12 shows a variation curve plotting the distribution of the magnetic field between two adjacent magnetoresistances of the magnetoresistant transduction device in accordance with the invention, along a direction which is that of the length of the two magnetoresistances.

DESCRIPTION OF THE PREFERRED EMBODIMENTS

Before giving a detailed description of the invention, it will be helpful to recall a few facts in order to provide a clearer grasp of the manner in which the magnetoresistant transduction device is formed in accordance with the present invention. This will be done, on one hand, by reference to the principles of operation of the franking machines illustrated by FIGS. 1 to 4, and, on an other hand, by reference to the prior art magnetoresistant transduction devices utilized in these machines and the illustrations of FIGS. 5, 6 and 7.

FIGS. 1 to 4 illustrate the shaft ARB of a franking machine positioned adjacent the prior art magnetoresistant transduction device, DTMR. To simplify matters, details of the franking machine, which is itself known in the art, have not been shown, and these figures illustrate no more than the shaft ARB of the franking machine and the magnetoresistant transduction device which makes it possible to verify that the franking values printed on the documents which are to be franked are actually those for which printing instructions had been issued.

The shaft ARB of the franking machine may turn in the direction of the arrow F. It comprises four rods $T_0$, $T_1$, $T_2$, $T_3$, of which only a rod $T_i$ is shown in FIGS. 1 to 4. All the rods $T_0$ to $T_3$ are positioned to slide within grooves formed in the periphery of the shaft ARB. Thus, the rod $T_i$ may slide longitudinally, in the illustrated groove, i.e., that is in a direction parallel to the axis of the shaft ARB and parallel to the axis of symmetry of the rod within the groove $R_i$. Each rod $T_i$ operates at one of its extremities, $EX_2$ for example, a wheel bearing printing symbols. This wheel bears ten printing characters corresponding to the numerals comprised between 0 and 9. This character-carrier wheel comes into contact with the letter to be franked, when the rod $T_i$ is displaced in the direction of the arrow f. This is performed, in well known manner, by means of a first wheel having the same axis as the character-carrier wheel, and which is provided at its periphery with a particular number of projections (this number is equal to the number of symbols which are to be printed, that is to say ten) which are in contact with the rod $T_i$. The character-carrier wheel and the second wheel bearing projections are not illustrated in FIGS. 1 to 4, for the sake of simplification.

The operation which consists in displacing the rod $T_i$ in the direction of the arrow f, in such manner that it displaces that projection of the first wheel which corresponds to the character of the character-carrier wheel which it is intended to place in contact with the document which is to receive an imprint, may be performed by means of an assembly comprising a toothed bar or rack and a barrel wheel (not shown in FIGS. 1 to 4 to simplify matters). This wheel is situated at the side of the extremity $EX_2$ of the rod $T_i$.

When it is wished to print a given numeral, the wheel is turned, which then acts on the rod when its periphery comes into contact with the rack of the latter, the rod then being displaced in the direction of the arrow f and being caused to push the projection of the first wheel which corresponds to the numeral it is wished to print. Upon pushing the projection, the character-carrier wheel is turned through an angle such that the character corresponding to the numeral it is wished to print is pressed against the document which is to be franked.

Each rod $T_1$ comprises a particular number of gaps and teeth. As is apparent from FIGS. 1 to 4, and more particularly from FIGS. 2 and 4, the rod $T_i$ illustrated comprises five gaps $TR_1$, $TR_2$, $TR_3$, $Tr_4$, $TR_5$, and five teeth $DE_1$, $DE_2$, $DE_3$, $DE_4$, $DE_5$. The gaps and teeth differ in dimension from each other. For example, the two teeth $DE_2$ and $DE_5$ are of identical width measured in the direction of the symmetry axis of the rod. It is equally apparent that the two teeth $DE_1$ and $DE_4$ are also of identical dimension still measured in a direction parallel to the symmetry axis of the rod $T_i$. It is apparent that the dimension of the teeth $DE_1$ and $DE_4$ is substantially twice that of the teeth $DE_2$ and $DE_5$. Similar observations may be made regarding the gaps. For example, it is apparent that the gaps $TR_1$ and $TR_4$ have the same dimension (still measured in a direction parallel to the symmetry axis of the rod $T_i$).

The material from which the rod $T_i$ is produced is preferably a metallic substance whose magnetic permeability greatly exceeds that of air. The four rods $T_0$ to $T_3$ are preferably identical.

Transduction device DTMR comprising five magnetoresistances $MR_1$-$MR_5$ is positioned close to the shaft ARB in order to check on whether the numeral printed on the document which is to be franked by means of the toothed barrel wheel situated at the side of the extremity $EX_2$ of the rod $T_i$ is actually that ordered to be imprinted.

The device DTMR comprises a magnetization device DA, which may be, for example, a permanent magnet, a substrate SUBS of electrically insulating material and five magnetoresistances $MR_1$, $MR_2$, $MR_3$, $MR_4$, $MR_5$ disposed on the substrate SUBS. The distances which separate respectively the symmetry axes of the magnetoresistances parallel to the axes Oy (see FIGS. 1, 3 and 4, for example) are, respectively $\lambda$ for the magnetoresistances $MR_4$ and $MR_5$ on the one hand and $MR_3$ and $MR_4$ on the other hand, $2\lambda$ for the magnetization $MR_2$ and $MR_3$ and finally $3\lambda$ for the magnetoresistances $MR_1$ and $MR_3$.

To convey a clearer understanding of the operation of the transducer DTMR, it is useful to recall some aspects illustrated by FIGS. 5 and 6 regarding magnetoresistances.

Thus a magnetoresistance MR is considered in FIG. 5. Its length L is much greater than its height h and its thickness e. If the magnetoresistance is produced in the form of thin layers, the height h is of the order of 20 to 50 microns. At both of its extremities, the magnetoresistance MR has connecting wires enabling the same to be connected to electronic circuits for reading the data it supplies. In current practice, the magnetoresistance MR is preferably produced from an anisotropic magnetic material; its axis $Ax_f$ of easy magnetization is parallel to its larger dimension, i.e., its length, and its axis of difficult magnetization $Ax_d$ is perpendicular to its larger dimension (having the same direction as the height h of the magnetoresistance). The current I passing through the magnetoresistance flows in the direction given by its length L, i.e., in the same direction as that of the axis of easy magnetization $Ax_f$. The magnetoresistance MR is preferably subjected to a magnetic field H parallel to the axis of difficult magnetization $Ax_d$.

FIG. 6 which shows the variation curve $\Delta R$ of the magnetoresistance MR as a function of the field applied to it in its direction of difficult magnetization, and provides a clearer grasp of the operation of a magnetoresistance. It is apparent that for the value H referred to as "anisotrophy field of the material" $H_k$, the magnetic material forming the magnetoresistance then being saturated in its direction of difficult magnetization, the resistance R no longer varies.

Referring to FIGS. 1 and 3, a system of axes $O_x$, $O_y$ is defined, which is situated, for example, in the plane of the substrate SUBS carrying the magnetoresistances $MR_1$ to $MR_5$. The axes of difficult magnetization $AX_{d1}$ to $AX_{d5}$ of the magnetoresistances $MR_1$ to $MR_5$ are parallel to the axis $O_y$ whereas the five axes of easy magnetization $AX_{f5}$ are parallel to the axis $O_x$. It is clearly apparent upon perusing FIG. 3, that the height of the magnetoresistances follows the same direction as the axis Oy, whereas the larger dimension (the length) of these same magnetoresistances is parallel to the axis Ox.

The magnetoresistance $MR_1$ is exposed to a magnetic field $H_{y1}$ in the direction of its axis of difficult magnetization $Ax_{d1}$, the magnetoresistance $MR_2$ is submitted to a field $H_{y2}$ in the direction of its axis of difficult magnetization $Ax_{d2}$, the magnetoresistance $MR_3$ is exposed to a field $H_{y3}$ in the direction of its axes of difficult magnetization $Ax_{d3}$, the magnetoresistances $MR_4$ are exposed to a field $H_{y4}$ in the direction of its axis of difficult magnetization $Ax_{d4}$ and, finally, the magnetoresistance $MR_5$ is exposed to the magnetic field $H_{y5}$ in the direction of its axis of difficult magnetization $Ax_{d5}$.

When the magnetoresistance $MR_1$ is opposite a gap, for example, the gap $TR_2$, the field $H_{y1}$ to which it is exposed is weaker than the field $H_{y2}$ to which is exposed the magnetoresistance $MR_2$ which is then positioned opposite the tooth $DE_3$. It is apparent that, as a rule, the fields to which are exposed the magnetoresistances $MR_1$ to $MR_5$ when they are positioned opposite the gaps, are substantially weaker than the fields to which they are exposed when they are positioned opposite the teeth. This derives from the fact that the lines of force of the magnetic field generated by the magnetization device DA are deformed in the air and that the magnetic field generated by the magnetization device DA in the air is substantially weaker than the magnetic field generated by this same magnetization device DA in the metallic substance forming the tooth $DE_1$.

If reference is made to FIG. 6, when a magnetoresistance such as $MR_1$ is situated opposite a gap and exposed to the corresponding field $H_{y1}$, an operating point $PF_t$ is established on the curve $\Delta R/R = f(H)$, corresponding to a value $\Delta R = \Delta R_1$ and a voltage variation $\Delta V_1$, if the magnetoresistance is not exposed to any magnetic field initially, with $\Delta V_1 = I \times \Delta R_1$.

Similarly, when a magnetoresistance such as $MR_2$ is exposed to a field $H_{y2} > H_{y1}$ upon being disposed opposite a tooth, an operating point $PF_D$ is established on the curve $\Delta R/R = f(H)$, corresponding to a resistance variation $\Delta R_2$ of the magnetoresistance, and a voltage variation $\Delta V_2 = I \times \Delta R_2$, if it is assumed that the magnetoresistance is initially exposed to a zero-value magnetic field.

It is apparent that upon rotation of the shaft ARB, and the longitudinal displacement of any one of the rods $T_i$, the magnetoresistances are confronted only by such teeth as $DE_1$ to $DE_5$ or such gaps as $TR_1$ to $TR_5$, and that they are thus exposed to no more than two magnetic fields of different value, such as the fields $H_{y1}$ and $H_{y2}$ shown in FIG. 6. Upon passing from a tooth to a gap, it is apparent from this same figure that the operating point passes from $PF_D$ to $PF_t$ and that a voltage variation $\Delta V = \Delta V_2 - \Delta V_1 = (\Delta R_2 - \Delta R_1) \times I$ is recorded. This variation $\Delta V = \Delta V_2 - \Delta V_1$ is positive. Conversely, upon passing from a gap to a tooth, a negative voltage variation $-V$ is observed. No voltage variation is observed upon passing from one tooth to another tooth. Similarly, no voltage variation is observed upon passing from one gap to another gap. It is apparent that as from the instant in which it is possible to define the initial state of the magnetoresistance (defined by $H = 0$, for example), it is always possible to determine whether the signal which may be observed at the terminals of the magnetoresistance corresponds to the presence of a gap or of a tooth in front of the same.

From FIG. 4 it can be seen that the length of the magnetoresistances is a little smaller than the minimum dimension which may be assumed by the teeth or gaps (this mimimum dimension being measured parallel to the symmetry axis of the rod $T_i$): accordingly, it is apparent that the length of the magnetoresistances is substantially of the order of the length (measured parallel to the symmetry axis of the rod $T_i$) of the tooth $DE_5$. Be that as it may, the distance separating two adjacent magnetoresistances (that is, to say the distance separating their axes of symmetry) is comparatively small, whether it is equal to $\lambda$, $2\lambda$, or $3\lambda$, as may be observed in FIG. 4. The result of this circumstance is that the magnetic field acting on each of the magnetoresistances is not that to which they would be exposed if they were perfectly isolated from each other (which amounts to saying if they were sufficiently spaced apart from each other). This is demonstrated by FIG. 7, illustrating the variation of the field $H_y$ between the extremities of two adjacent magnetoresistances, for example, $MR_1$ and $MR_2$, as a function of the distance d, the magnetoresistance $MR_1$ being assumed to be situated opposite a gap and the magnetoresistance $MR_2$ being assumed to be situated opposite a tooth. The distance d is measured along the axis Ox.

The magnetic field to which the magnetoresistance $MR_1$ would be exposed, if the magnetoresistances $MR_1$ to $MR_5$ were confronted only by gaps, would be $H_{ymin1}$. Analogously, if the magnetoresistances were confronted by teeth only, (which would correspond to a solid rod), the magnetic field to which these would be exposed would be $H_{ymax2}$. It is apparent from FIG. 7 that the magnetic field to which the magnetoresistances $MR_1$ and $MR_2$ are exposed actually differs from $H_{ymin1}$ and $H_{ymax2}$.

Throughout the length of the magnetoresistance $MR_1$, the magnetic field varies between the value $H_{ymin1}$ and a value $H_{max1}$ having a mean value equal to $H_{ymo1}$ appreciably greater than $H_{ymin1}$. Depending on the length of the magnetoresistance $MR_2$, the magnetic field varies between a value $H_{ymin2}$ and a value $H_{ymax2}$, the mean value then being substantially equal to $H_{ymo2}$ which is much lower than $H_{ymax2}$. On average, the operating point of the magnetoresistance $MR_1$ (refer to FIG. 6) is defined by the value $H_{ymo1}$ whereas the operating point of the magnetoresistance $MR_2$ is defined by the mean field $H_{ymo2}$. Referring to FIG. 6, it is thus apparent that it is possible to state $H_{y2}=H_{ymo2}$ and $H_{y1}=H_{ymo1}$. It is apparent that these operating points differ very substantially from what they would be if the magnetic field to which each of the two magnetoresistances $MR_1$ and $MR_2$ would be submitted were either $H_{ymin1}$ or $H_{ymax2}$. Consequently, it is apparent that the interaction between the magnetic field lines acting on two adjacent magnetoresistances greatly reduces the sensitivity of the magnetoresistances.

The transduction device DTMRI constructed in accordance with the principles of the present invention enables these disadvantages to be substantially overcome.

Referring to FIGS. 8, 9 and 10, the transduction device DTMRI according to the present invention comprises a magnetic field generation device DGCMI and five magnetoresistances $MRI_1$, $MRI_2$, $MRI_3$, $MRI_4$, $MRI_5$ of anisotropic magnetic material. The magnetic field generation device DGCMI itself comprises a magnetization device, which may be, for example, a permanent magnet DAI, and a magnetic grid of non-remanent magnetic material GMI.

As is apparent from FIGS. 9 and 10, the magnetic grid GMI comprises a plurality of magnetic field focussing elements $EFI_1$, $EFI_2$, $EFI_3$, $EFI_4$, $EFI_5$. All these elements are strictly identical to each other. They are generally U or C shaped and secured to the magnetization device DAI by means of magnetic bars $BAR_1$ and $BAR_2$ connected respectively to opposite ends of the elements. The distance separating the parallel axes Oy of symmetry of the different focussing elements $EFI_4$ and $EFI_5$ on the one hand, $EFI_3$ and $EFI_4$ on the other hand, is substantially equal to $\lambda$, whereas the distance separating the focussing elements $EFI_3$ and $EFI_2$ on the one hand is equal to $2\lambda$, and that the distance separating $EFI_1$ and $EFI_2$ on the other hand is equal to $3\lambda$.

The magnetoresistances $MRI_1$ to $MRI_5$ are situated on a substrate SUBS1 which is itself secured on the central portions of the five focussing elements $EFI_1$ to $EFI_5$. As is apparent from FIG. 11, the axes of difficult magnetization $ADI_1$ to $ADI_5$ of the magnetoresistances $MRI_1$ to $MRI_5$ are mutually parallel and have the same direction as the axis Oy. The axes of easy magnetization $AFI_1$ to $AFI_5$ of these same magnetoresistances all have the same direction, being that of the axis Ox. It is apparent that the magnetoresistances are arranged in such a manner that they are aligned with each other in the direction of their larger dimension.

The magnetic fields generated by the magnetization device DAI are channelled or focussed by the different elements $EFI_1$ to $EFI_5$ and if the permeability of the non-remenant magnetic material forming them is adequate, there is practically no interaction (interference) between the magnetic field lines acting on each of the magnoresistances $MRI_1$ to $MRI_5$.

Consequently, the magnetic field lines generated by the magnetization device DAI at the level of a tooth (and consequently of the magnetoresistance opposite the same since it is positioned at a very samll distance from the tooth) do not interfere with the magnetic field lines generate by this same magnetization device across a gap (and consequently across the magnetoresistance opposite the same). Thanks to the presence of the magnetic grid of non-remanent magnetic material, comprising separate and mutually parallel elements $EFI_1$ to $EFI_5$, it is apparent that the magnetoresistant transduction device DTRMI in accordance with the invention makes it possible to establish a plurality of magnetic fields from a magnetic field source (the magnetization device itself) which are totally independent of each other. Each of the elements $EFI_1$ to $EFI_5$ is in effect a magnetic field focussing element, which focusses the magnetic field lines on each of the magnetoresistances $MRI_1$ to $MRI_5$.

If reference is now made to FIG. 12, which illustrates the magnetic field variation curve, being that of the field acting on the adjacent magnetoresistances $MRI_1$ and $MRI_2$ as a function of the distance measured along the axis Ox, it is apparent that the distribution of the magnetic fields $H'_y$ along a magnetoresistance is practically uniform throughout its length. Consequently, $H'_{ymin1}=H'_{ymax1}=H'_{ymo1}$, is practically applicable for the magnetoresistance $MRI_1$. It is clear that as in FIG. 7, it has been assumed that the magnetoresistance $MRI_1$ has been positioned opposite a gap whereas the magnetoresistance $MRI_2$ is assumed to be positioned opposite a tooth.

Consequently, it may be stated that the value $H'_{ymo1}$ at the center of the magnetoresistance is practically equal to the value of the magnetic field at both extremities of the same. An identical action may be observed for the magnetoresistance $MRI_2$ in which the value of the magnetic field at the center of the magnetoresistance, $H'_{ymo2}$, is practically equal to the value of the magnetic field at both extremities, that is $H'_{ymin2}$ on the one hand, and $H'_{ymax2}$ on the other hand. As as a result, it may be stated that the magnetic field determining the point of operation of the two magnetoresistances $MRI_1$ and $MRI_2$ is, respectively, $H'_{ymo1}$ for the magnetoresistance $MRI_1$, and $H'_{ymo2}$ for the magnetoresistances $MRI_2$. By comparing FIGS. 12 and 7, it is possible to gauge the total advantage of the magnetoresistant transduction device in accordance with the invention which offers a much higher degree of sensitivity than the magnetoresistant device in accordance with the prior art.

I claim:

1. A magnetoresistant transduction device for reading coded data, comprising a plurality of magnetoresistances having a larger dimension and and adapted to be disposed opposite the coded data and to be aligned with each other in the direction of their larger dimension, a magnetization device for generating a magnetic field having a value at each of the magnetoresistances which is a function of the coded data placed opposite the corresponding magnetoresistance, a grid of non-remanent magnetic material having a a plurality of parallel focusing elements arranged between the magnetization device and the magnetoresistances, each focusing element being associated with only one magnetoresistance and each focusing element carrying the magnetic field generated by the magnetization device to and focusing the magnetic field on its associated magnetoresistance, such that the magnetic fields acting on the magnetoresistances are independent from each other.

2. A device for generating a plurality of mutually independent magnetic fields comprising a magnetization device for generating a magnetic field, and a grid of non-remanent magnetic material comprising a plurality of n parallel elements associated with said magnetization device and arranged for focussing the magnetic field generated by the magnetization device so as to produce in the immediate vicinity of the elements a plurality n of mutually independent magnetic fields.

3. A device according to claims 1 or 2 wherein the magnetization device is a permanent magnet.

4. A device according to claim 1 wherein the magnetoresistances are of anisotropic magnetic material.

5. A device according to claim 2 further comprising a plurality of magnetoresistances of anisotropic material supported by said elements and adapted to be disposed opposite predetermined data locations for reading the data at said locations.

6. A device according to claim 1 or 5 wherein the elements are C shape and are connected at one end to a first magnetic bar and at another end to a second magnetic bar said bars being secured to one face of the magnetization device.

7. A device according to claim 6 further including a substrate, said magnetoresistances being mounted on said substrate, said substrate being secured to central portions of said elements.

8. A device according to claim 1 or 5 wherein said magnetoresistances each have an axis of difficult magnetization and an axis of easy magnetization perpendicular to the axis of difficult magnetization, and wherein the magnetoresistances are aligned such that their axes of easy magnetization are parallel.

* * * * *